(12) United States Patent
Shi et al.

(10) Patent No.: US 7,782,539 B2
(45) Date of Patent: Aug. 24, 2010

(54) IMMERSION MICROSCOPE OBJECTIVE

(75) Inventors: Renhu Shi, Goettingen (DE); Ingo Fahlbusch, Goettingen (DE); Werner Kleinschmidt, Adelebsen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 366 days.

(21) Appl. No.: 11/979,580

(22) Filed: Nov. 6, 2007

(65) Prior Publication Data

US 2008/0106795 A1 May 8, 2008

(30) Foreign Application Priority Data

Nov. 6, 2006 (DE) .................... 10 2006 052 142

(51) Int. Cl.
*G02B 21/02* (2006.01)
*G02B 21/00* (2006.01)

(52) U.S. Cl. .................................. 359/656; 359/379
(58) Field of Classification Search ......... 359/656–658, 359/754, 755, 379, 382
See application file for complete search history.

(56) References Cited

U.S. PATENT DOCUMENTS

| 5,530,590 A | 6/1996 | Saito |
| 2006/0087745 A1 | 4/2006 | Fahlbusch et al. |

*Primary Examiner*—Jack Dinh
(74) *Attorney, Agent, or Firm*—Walter Ottesen

(57) ABSTRACT

An immersion microscope objective includes a system of several optical lenses or lens groups between which air spaces are provided and an adjusting device for adapting the immersion microscope objective to different immersion mediums for correcting imaging errors when utilizing the immersion microscope objective in connection with a cover glass, which closes off a specimen holder, and/or for correcting longitudinal chromatic aberrations. The adjusting device is configured to change two air spaces and especially the air spaces ($A_1, A_2$) are linearly changeable.

21 Claims, 4 Drawing Sheets

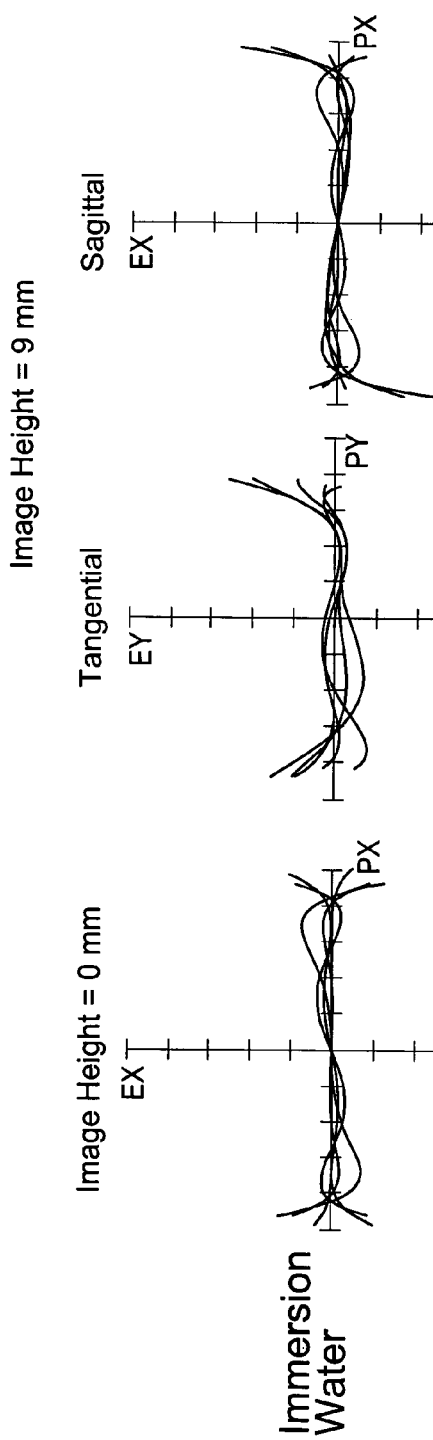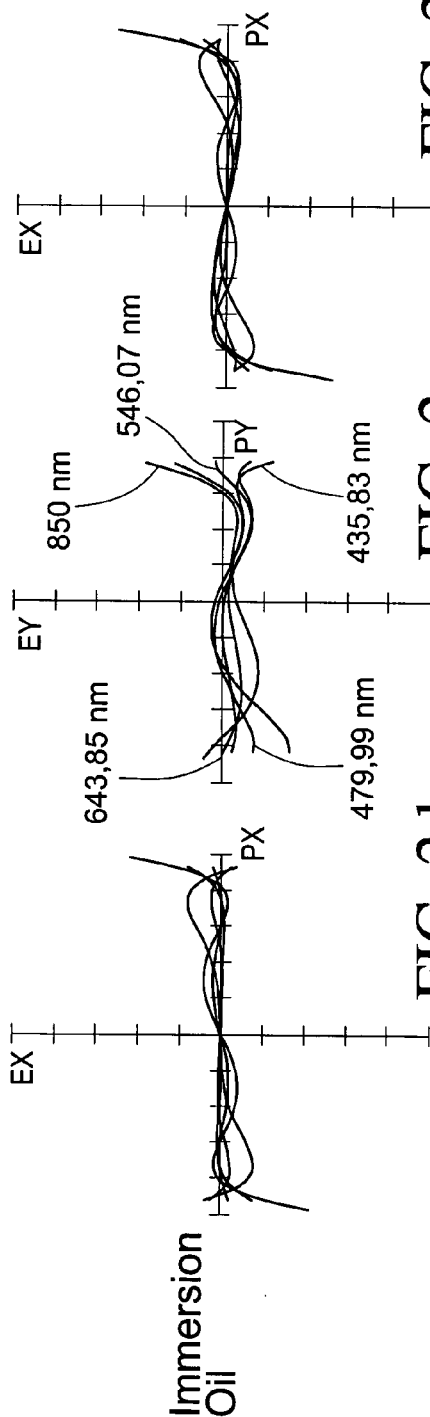

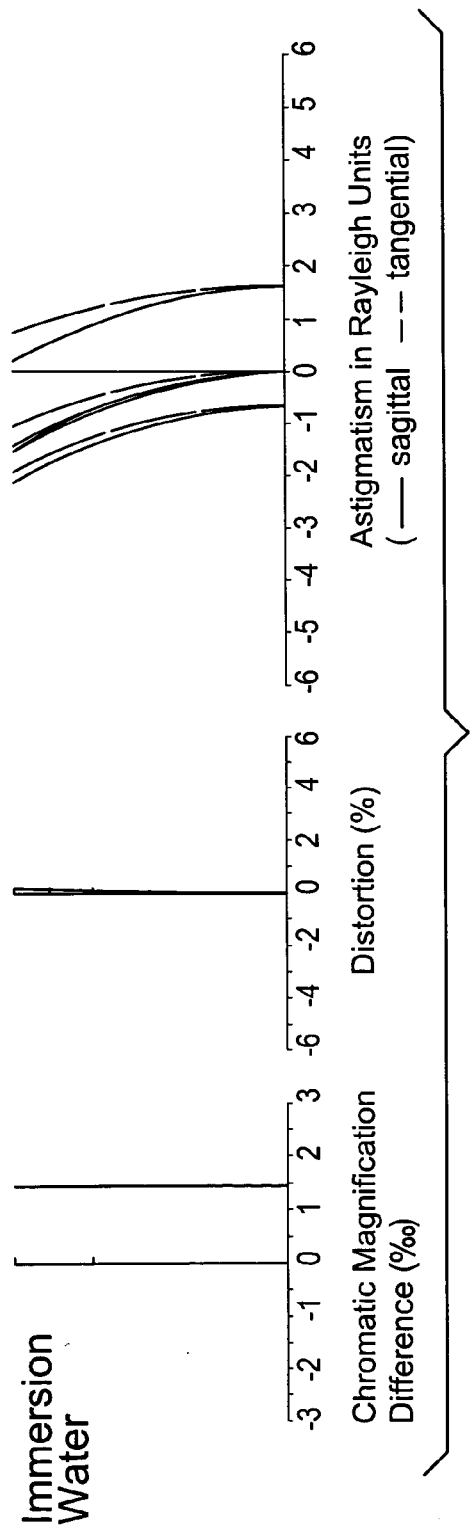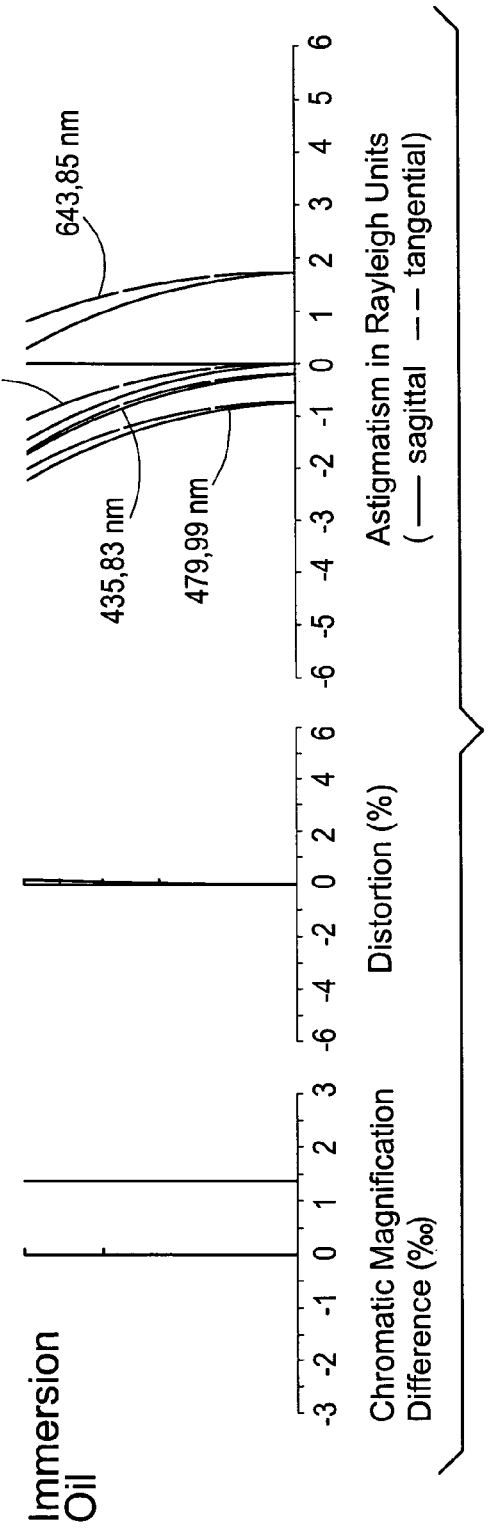
FIG. 3a
FIG. 3b

IMMERSION MICROSCOPE OBJECTIVE

CROSS REFERENCE TO RELATED APPLICATION

This application claims priority of German patent application no. 10 2006 052 142.0, filed Nov. 6, 2006, the entire content of which is incorporated herein by reference.

FIELD OF THE INVENTION

The invention relates to an immersion microscope objective which includes a system of several optical lenses or lens groups between which air spaces are provided. An adjusting device is also provided for the following: adapting the immersion microscope objective to various immersion mediums; correcting imaging errors in the use of the immersion microscope objective in association with a cover glass which closes off the specimen holder; and/or, correcting longitudinal chromatic aberrations.

BACKGROUND OF THE INVENTION

The immersion microscope objective of the invention is assigned to the class known as "planapochromat". A planapochromat is characterized in that the focus positions of the spectral lines e, C' and F' are coincident. The "plan" in planapochromat means "planar" and that the image field is flattened.

Water, glycerine and oil can be used as immersion mediums whereby the immersion microscope objective is especially suitable for live cell imaging methods. Here, it is necessary that the indices of refraction of the liquids on both sides of the cover glass approximate each other. The immersion medium "water" is suitable for the examination of living objects especially when the objective is to be immersed directly into the aqueous medium without cover glass. In contrast, for critical fluorescence examinations, a purified glycerine is preferable as the immersion medium because purified glycerine has virtually no inherent fluorescence.

Glycerine and water are preferably utilized in the microscopy of living objects because these objects are in a medium having a similar index of refraction.

Furthermore, it is desirable that the objective also is usable with oil as an immersion medium so that the objective can be used for other usual viewing. Furthermore, a large work distance is wanted because objectives having a large working distance ensure easy accessibility to the specimen.

Various immersion microscope objectives are known from the state of the art. Thus, a microscope objective having three different variations with respective numerical apertures of 1.15 is shown by way of example in U.S. Pat. No. 5,530,590. This objective comprises three lens groups. The second lens group can be displaced along the optical axis relative to the two other lens groups in order to adapt the objective to the thickness of the cover glass and to so compensate the spherical and chromatic aberration which varies with this thickness.

In United States patent publication US 2006/0087745 A1, an immersion microscope objective is likewise described which, however, does not yet satisfy the requirements in many applications with respect to the correction of the longitudinal chromatic aberration or the planapochromatic correction. Furthermore, this objective is not corrected for oil as an immersion medium.

SUMMARY OF THE INVENTION

In view of the foregoing, it is an object of the invention to provide an immersion microscope objective which can be used for various immersion mediums and which has an image contrast improved with respect to the state of the art as well as achieving a correction of the longitudinal chromatic aberration.

According to a feature of the invention, the adjusting device in an immersion microscope objective of the type referred to above is configured for changing two air spaces. The air spaces $(A_1, A_2)$ are linearly changeable.

A linear change of the two air spaces $(A_1, A_2)$ is provided for adapting to different immersion mediums in accordance with the function:

$$\frac{A_{2,Oil,oD} - A_{2,Gly,oD}}{A_{2,Gly,oD} - A_{2,Wat,oD}} = \frac{A_{1,Oil,oD} - A_{1,Gly,oD}}{A_{1,Gly,oD} - A_{1,Wat,oD}}$$

wherein: the index "Oil,oD" is for the particular air space with the use of the immersion medium "oil" without a cover glass; "Gly,oD" is for the particular air space with the use of the immersion medium "glycerine" without a cover glass; and, "Wat,oD" is for the particular air space when using the immersion medium "water" without a cover glass.

For correcting imaging errors when utilizing a cover glass, a linear change of the two air spaces $(A_1, A_2)$ is provided according to the function:

$$\frac{A_{2,1mm,mD} - A_{2,1mm,oD}}{A_{2,Gly,oD} - A_{2,Wat,oD}} = \frac{A_{1,1mm,mD} - A_{1,1mm,oD}}{A_{1,Gly,oD} - A_{1,Wat,oD}}$$

wherein: the index "1 mm,mD" is for the particular air space when utilizing an immersion medium with a cover glass; "1 mm,oD" is for the particular air space when utilizing an immersion medium without cover glass; "Gly,oD" is for the corresponding air space when utilizing the immersion medium "glycerine" without cover glass; and, "Wat,oD" is for the particular air space when utilizing the immersion medium "water" without a cover glass.

In a specific embodiment, the immersion microscope objective viewed from the specimen comprises:

(a) a two-lens composite member $G_1$ having a positive refractive power and formed from a fill lens $L_1$ and a parent spherical lens $L_2$;
(b) a biconvex lens $L_3$;
(c) a first meniscus lens $L_4$ having a positive refractive power;
(d) a two-lens composite member $G_2$ having positive refractive power and comprising a biconcave lens $L_5$ and a biconvex lens $L_6$;
(e) a two-lens composite member $G_3$ having positive refractive power and comprising a biconvex lens $L_7$ and a second meniscus lens $L_8$;
(f) a third meniscus lens $L_9$ having negative refractive power; and,
(g) a fourth meniscus lens $L_{10}$ having positive refractive power.

The air space $A_1$ between the composite member $G_1$ and the biconvex lens $L_3$ and the air space $A_2$ between the biconvex lens $L_3$ and the meniscus lens $L_4$ are changeable.

The front surface of the fill lens $L_1$ in the composite member $G_1$ is configured to be planar and the centers of curvature of the two surfaces of the parent spherical lens $L_2$ lie on the object side and the centers of curvature of the two surfaces of the meniscus lens $L_4$ lie on the image side and the centers of curvature of the two surfaces of the meniscus lens $L_8$ lie on the object side and the centers of curvature of two surfaces of the meniscus lens $L_9$ lie on the image side and the centers of curvature of the two surfaces of the meniscus lens $L_{10}$ lie on the object side.

For the lenses $L_1$ and $L_2$, the following indices of refraction $n_e$ and Abbe numbers $v_e$ are for the spectral line e (546.07 nm):

$n_{e,L1} < 1.50$, $v_{e,L1} > 70$ $n_{e,L2} > 1.85$, $v_{e,L2} < 42$

For the lenses L9 and L10, the following indices of refraction $n_e$ and Abbe numbers $v_e$ are for the spectral line e (546.07 nm):

$n_{e,L9} > 1.80$, $v_{e,L9} > 45$ $n_{e,L10} < 1.60$, $v_{e,L10} < 40$

The net transmission at the wavelength 365 nm is greater than 50% and is therefore ideal for fluorescence investigations and at a wavelength of 850 nm, the net transmission is greater than 84%.

In contrast to such multi-immersion objectives known previously, a planapochromatic correction over a wide spectrum from 450 nm to 850 nm is realized with this objective. All wavelengths of this range are corrected to be diffraction limited. The customer need not refocus when changing the wavelength within this spectrum.

In order to correct the spherical aberration, the longitudinal chromatic aberration, and some other imaging errors when changing the immersion medium, it is only necessary to change two air spaces in the optical system. In the specific case, these air spaces are $A_1$ and $A_2$. These changes can be carried out in a simple manner with the aid of a correction ring.

Furthermore, the spherical aberrations can also be corrected with the immersion microscope objective of the invention. This spherical aberration occurs with the use with or without a cover glass. The corresponding correction is likewise achieved by changing the two air spaces.

The variations of the air spaces take place linearly whereby a simple construction of the adjusting device, that is, the correction ring, is possible.

BRIEF DESCRIPTION OF THE DRAWINGS

The invention will now be described with reference to the drawings wherein:

FIGS. 2a to 2f show examples for transverse aberrations as a function of the aperture of the immersion microscope objective when utilizing water and glycerine as the immersion mediums;

FIGS. 3a and 3b show examples for field-dependent imaging errors of the immersion microscope objective when utilizing water and glycerine as immersion mediums; and, FIG. 4 is a side elevation view of an immersion microscope objective showing a portion of the main mount broken away to reveal an embodiment of the adjusting device for changing two of the air spaces between lens units.

DESCRIPTION OF THE PREFERRED EMBODIMENTS OF THE INVENTION

Figure 1A:
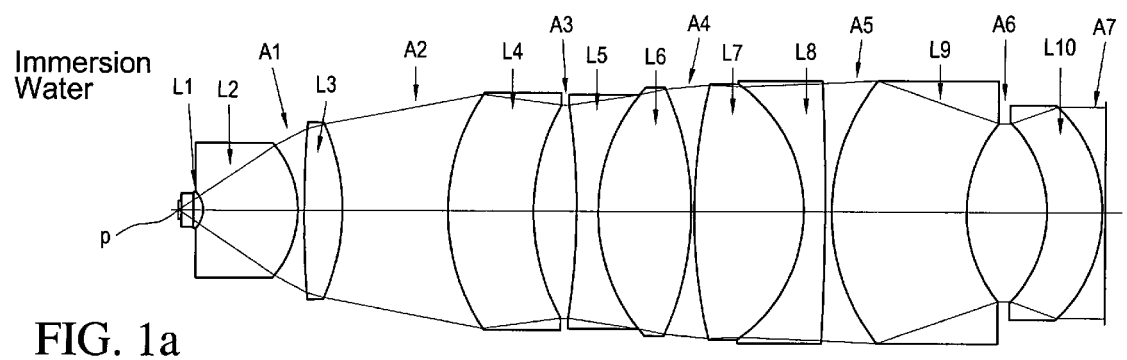
FIGS. 1a and 1b show a possible objective configuration corresponding to the system data set forth in Table A with water as the immersion medium.
Figure 1B:
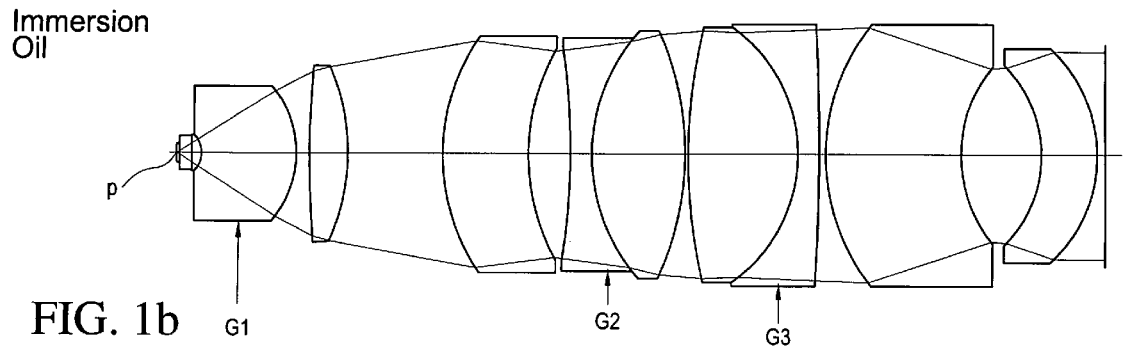

FIGS. 1a and 1b show an embodiment of an objective assembly. In both FIGS. 1a and 1b, a specimen P is indicated as the object to be examined and an immersion medium is identified as being immersion water.

Starting from the specimen P and the immersion medium, and going from left to right in FIGS. 1a and 1b, the following are shown:

(a) a two-fold composite lens $G_1$ having positive refractive power and formed from a fill lens $L_1$ and a parent spherical lens $L_2$;

(b) a biconvex lens $L_3$;

(c) a first meniscus lens $L_4$ having positive refractive power;

(d) a two-fold composite lens $G_2$ having positive refractive power and comprising a biconcave lens $L_5$ and a biconvex lens $L_6$;

(e) a two-fold composite lens $G_3$ having positive refractive power comprising a biconvex $L_7$ and a second meniscus lens $L_8$;

(f) a third meniscus lens $L_9$ having negative refractive power; and, (g) a fourth meniscus lens $L_{10}$ having positive refractive power.

Spaces $A_1$ to $A_8$ are provided between the individual lenses and the composite lenses and the spaces $A_1$ and $A_2$ are changeable by means of correction rings (not shown in FIGS. 1a and 1b).

The adjusting device for varying the spaces $A_1$ and $A_2$ includes correction rings and is provided on the frame of the objective as will be described hereafter with respect to FIG. 4.

A rear diaphragm follows the space $A_7$ and closes off the objective. The lens of a tube system (not shown here) follows the objective at a spacing $A_8$. This lens of the tube system has a focal length of 164.50 mm.

The two configurations shown in FIGS. 1a and 1b differ only in the spaces $A_1$ and $A_2$ from each other. These spaces are adjusted depending upon the thickness of the cover glass and the immersion medium in correspondence to the above-delineated conditions.

The immersion microscope objective of FIGS. 1a and 1b has the system data for a spectral line e (546.07 nm) set forth in Table A which lists: radii; thicknesses and spaces; refractive indices $n_e$ and Abbe numbers $v_e$.

TABLE A

|  | Radius | Thickness/Space | $n_e$ | $v_e$ |
|---|---|---|---|---|
| Cover glass | Planar | CG | 1.525 | 59.2 |
| Immersion medium | Planar | $A_0$ | Water/Glycerine/Oil | |
| L1 | Planar | 0.500 | 1.489 | 70.2 |
|  | −1.3725 | | | |
| L2 | | 4.990 | 1.888 | 40.5 |
|  | −5.2330 | | | |
|  | 43.4010 | $A_1$ (variable) | | |

TABLE A-continued

| | Radius | Thickness/Space | $n_e$ | $v_e$ |
|---|---|---|---|---|
| L3 | | 2.000 | 1.530 | 76.6 |
| | −10.9840 | | | |
| | | $A_2$ (variable) | | |
| | 10.1450 | | | |
| L4 | | 4.500 | 1.551 | 45.5 |
| | 10.2920 | | | |
| | | $A_3 = 2.300$ | | |
| | −34.4750 | | | |
| L5 | | 1.100 | 1.641 | 42.2 |
| | 8.9125 | | | |
| L6 | | 5.000 | 1.530 | 76.6 |
| | −14.2270 | | | |
| | | $A_4 = 0.100$ | | |
| | 24.0570 | | | |
| L7 | | 5.800 | 1.530 | 76.6 |
| | −7.6076 | | | |
| L8 | | 1.100 | 1.617 | 44.3 |
| | −175.2900 | | | |
| | | $A_5 = 0.356$ | | |
| | 10.1450 | | | |
| L9 | | 7.000 | 1.820 | 46.4 |
| | 6.8786 | | | |
| | | $A_6 = 4.200$ | | |
| | −6.5879 | | | |
| L10 | | 2.830 | 1.597 | 35.0 |
| | −7.3918 | | | |
| | | $A_7 = 0.150$ | | |
| | Planar | | | |
| | | $A_8 = 126.50$ | | |

Tubular lens having a focal length of 164.5 mm

With water as the immersion medium, the immersion microscope objective of Table A has the following parameters: numerical aperture=0.8; the imaging scale=−24.7; and, the field of view number=18. With glycerine as the immersion medium, the following apply: numerical aperture=0.8; imaging scale=−25.0; and, the field of view number=18. With oil as the immersion medium, the following apply: numerical aperture=0.8; imaging scale=−25.2; and, the field of view number=18.

Table B sets forth the values which are applicable for the different immersion mediums:

TABLE B

| Immersion | CG | $A_0$ | $A_1$ | $A_2$ |
|---|---|---|---|---|
| Water | 0 | 0.768 | 0.215 | 5.742 |
| Water | 0.170 | 0.600 | 0.301 | 5.563 |
| Glycerine | 0 | 0.769 | 0.495 | 5.160 |
| Glycerine | 0.170 | 0.600 | 0.521 | 5.106 |
| Oil | 0 | 0.769 | 0.616 | 4.910 |
| Oil | 0.170 | 0.600 | 0.616 | 4.910 | wherein: CG=cover glass thickness; $A_0$=work space; $A_1$=air space; and, $A_2$=air space.

The correction of longitudinal chromatic aberrations takes place in a spectral range of 450 nm to 1,000 nm. The deviation of the best focus position of the secondary wavelength from the principal wavelength lies within a depth of field. When using water as the immersion medium, this deviation lies in the range of 450 nm to 950 nm and when using oil as the immersion medium, this deviation lies in the range of 480 nm to 1,000 nm.

The transverse aberrations at different wavelengths in dependence upon the aperture for water as the immersion medium are shown in FIGS. 2a to 2c. The transverse aberrations plotted as a function of the aperture for glycerine as the immersion medium are shown in FIGS. 2d to 2f. Here, a subdivision of the vertical coordinate EX corresponds to 0.08 mm. The aperture is plotted on the abscissa PX.

FIG. 3a shows, by way of example, the field dependent imaging errors for water as the immersion medium and FIG. 3b shows the field dependent imaging errors for glycerine as the immersion medium at the wavelengths of 546.07 nm, 643.85 nm, 479.99 nm and 435.83 nm.

Figure 4:
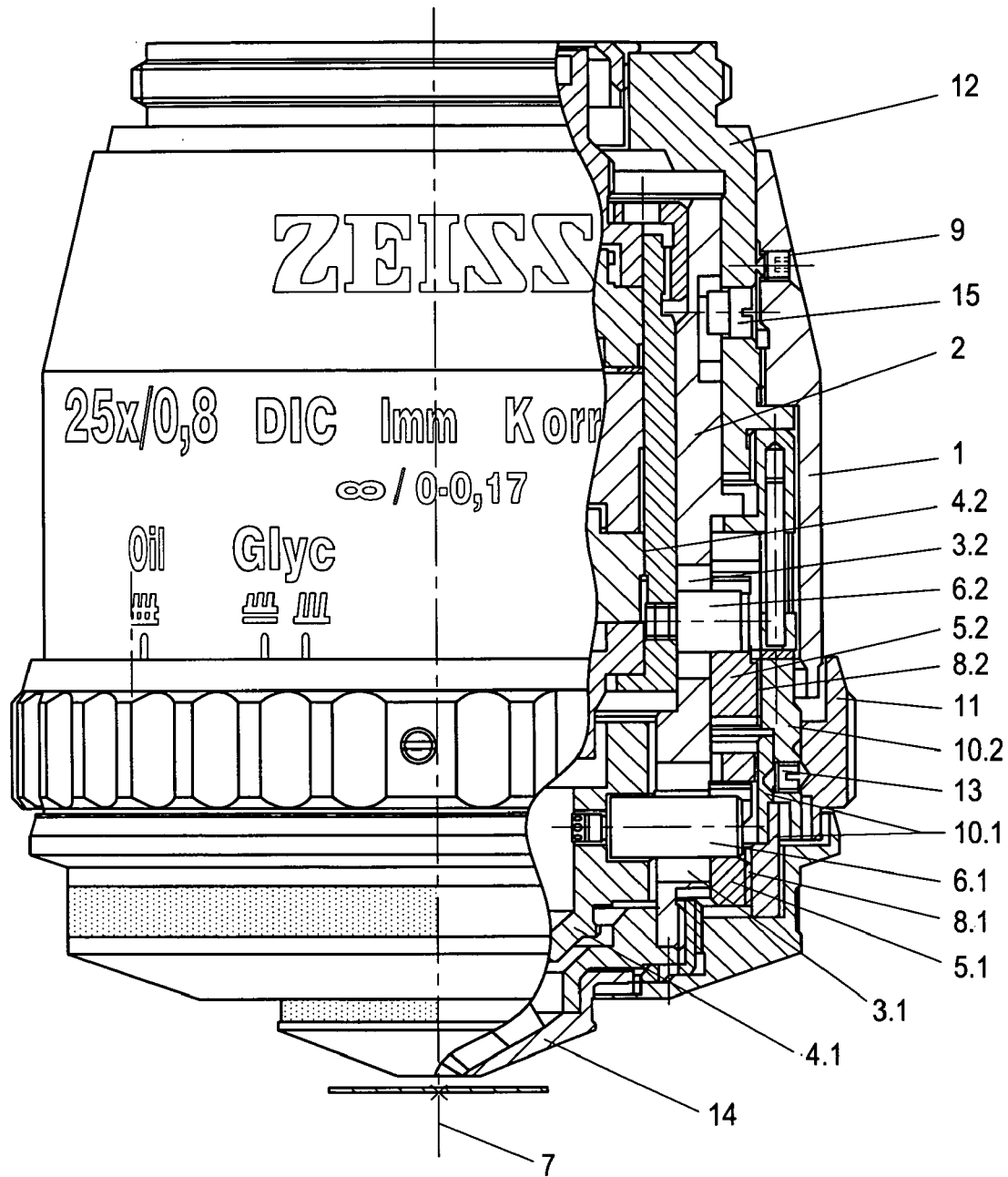

FIG. 4 shows an immersion microscope objective incorporating an adjusting device including means for changing the two air spaces $A_1$ and $A_2$ in FIG. 1a or FIG. 1b.

The adjusting device comprises correcting rings 4.1 and 4.2 which hold optical units (not shown in FIG. 4) and the threaded rings 5.1 and 5.2 are connected by bolts 6.1 and 6.2. The threaded rings 5.1 and 5.2 have outer threads 8.1 and 8.2, respectively. The bolts 6.1 and 6.2 extend through axial breakthroughs 3.1 and 3.2 of the cylinder sleeve 2 and can, together with the threaded rings 5.1 and 5.2 and the correction rings 4.1 and 4.2, only be adjusted or displaced in the direction of the optical axis 7. The cylinder sleeve 2 is fixedly mounted in the main mount 1.

A rotation about the optical axis 7 is not possible because the cylinder sleeve 2 is connected to sleeve 12 via threaded fastener 15 and the sleeve 12 is connected to the main mount 1 via the threaded pin 9. With the rotation of an adjusting ring 11 about the optical axis 7, the mutually connected entraining rings 10.1 and 10.2 are taken along and rotated about the optical axis 7. The entraining ring 10.1 comprises two rings connected to each other with adhesive.

The two entraining rings 10.1 and 10.2 are connected fixedly to each other via the threaded pin 13. With a rotation of the entraining rings 10.1 and 10.2 via the adjusting ring 11, an axial displacement of the correction rings 4.1 and 4.2 and the optical elements held therein is realized. This takes place as a consequence of the coaction of inner threads of the entraining rings (10.1, 10.2) with corresponding ones of the outer threads 8.1 and 8.2 of the threaded rings (5.1, 5.2) which are mounted so that they are resistant to torsion.

Referring to FIGS. 1a and 1b and by way of example, the two-lens composite member $G_1$ comprising fill lens $L_1$ and parent spherical lens $L_2$ can be mounted in correction ring 4.1 and biconvex lens $L_3$ can be mounted in correction ring 4.2. The adjusting device effects a shifting of the optical lenses to achieve a change of the spacings $A_1$ and $A_2$. This involves axially displacing the two threaded rings 5.1 and 5.2 simultaneously which, in turn, causes the correction rings 4.1 and 4.2 to be displaced differently along the optical axis 7. This is achieved by imparting different thread pitches to threaded rings 5.1 and 5.2.

The adjusting device shown in FIG. 4 and described above does the following:

(a) adapts the immersion microscope objective to different immersion mediums;

(b) corrects aberrations or imaging errors occurring because of the cover glass closing off a specimen vessel; and/or, (c) corrects longitudinal chromatic aberrations.

The immersion microscope objective described above with respect to FIGS. 1a to 4 can be used for various immersion mediums and provides an improved image contrast as well as achieving a correction of longitudinal chromatic aberration.

It is understood that the foregoing description is that of the preferred embodiments of the invention and that various changes and modifications may be made thereto without departing from the spirit and scope of the invention as defined in the appended claims.

REFERENCE CHARACTER LIST

| | |
|---|---|
| A1 to A8 | Spaces |
| G1 to G3 | Composite lenses |
| L1 | Fill lens |
| L2 | Parent spherical lens |
| L3 | Biconvex lens |
| L4 | Meniscus lens |
| L5 | Biconcave lens |
| L6, L7 | Biconvex lenses |
| L8, L9, L10 | Meniscus lenses |
| EX | Vertical coordinate |
| PX | Abscissa |
| 1 | Main mount |
| 2 | Cylinder sleeve |
| 3.1 | First breakthrough |
| 3.2 | Second breakthrough |
| 4.1 | First correction ring |
| 4.2 | Second correction ring |
| 5.1 | First threaded ring |
| 5.2 | Second threaded ring |
| 6.1 | First bolt |
| 6.2 | Second bolt |
| 7 | Optical axis |
| 8.1 | First outer thread |
| 8.2 | Second outer thread |
| 9 | Threaded pin |
| 10.1 | First entraining ring |
| 10.2 | Second entraining ring |
| 11 | Adjusting ring |
| 12 | Sleeve |
| 13 | Threaded pin |
| 14 | Frame for holding first optical element |
| 15 | Threaded fastener |

What is claimed is:

1. An immersion microscope objective or examining a specimen, the immersion microscope objective comprising:
a plurality of optical lens units conjointly defining an optical axis;
said optical lens units being arranged so as to define respective air spaces between ,said optical lens units;
an adjusting device for adapting said immersion microscope objective to different immersion mediums;
said adjusting device including means for linearly changing two of said air spaces; and,
wherein, for adapting to different immersion mediums, the linear change of said two air spaces takes place in accordance with the following function:

$$\frac{A_{2,Oil,oD} - A_{2,Gly,oD}}{A_{2,Gly,oD} - A_{2,Wat,oD}} = \frac{A_{1,Oil,oD} - A_{1,Gly,oD}}{A_{1,Gly,oD} - A_{1,Wat,oD}}$$

wherein the index: "Oil,oD" is for the particular air space with the use of the immersion medium "oil" without a cover glass; "Gly,oD" is for the particular air space with the use of the immersion medium "glycerine" without a cover glass; and, "Wat,oD" is for the particular air space when using the immersion medium "water" without a cover glass.

2. An immersion microscope objective for examining a specimen, the immersion microscope objective comprising:
a plurality of optical lens units conjointly defining an optical axis;
said optical lens units being arranged so as to define respective air spaces between said optical lens units;
an adjusting device for correcting aberrations or imaging errors occurring because of a cover glass closing off a specimen vessel for holding a specimen;
said adjusting device including means for linearly chancing two of said air spaces; and,
wherein, for correcting said aberrations or imaging errors occurring because of said cover glass, the linear change of said two air spaces takes place in accordance with the function:

$$\frac{A_{2,Imm,mD} - A_{2,Imm,oD}}{A_{2,Gly,oD} - A_{2,Wat,oD}} = \frac{A_{1,Imm,mD} - A_{1,Imm,oD}}{A_{1,Gly,oD} - A_{1,Wat,oD}}$$

wherein the index: "Imm,mD" is for the particular air space when utilizing an immersion medium with a cover glass; "1 mm,oD" is for the particular air space when utilizing an immersion medium without a cover glass; "Gly,oD" is for the corresponding air space when utilizing the immersion medium "glycerine" without a cover glass; and, "Wat,oD" is for the particular air space when utilizing the immersion medium "water" without a cover glass.

3. An immersion microscope objective for examining a specimen, the immersion microscope objective comprising:
a plurality of optical lens units conjointly defining an optical axis;
said optical lens units being arranged so as to define respective air spaces between said optical lens units;
an adjusting device for doing at least one of the following:
(a) adapting said immersion microscope objective to different immersion mediums;
(b) correcting aberrations or imaging errors occurring because of a cover glass closing off a specimen vessel for holding a specimen;
(c) correcting longitudinal chromatic aberrations; and,
said adjusting device including means for changing two of said air spaces; and,
wherein said plurality of optical lens units include the following arranged along said optical axis starting from the specimen:
(a) a two-lens composite member $G_1$ having a positive refractive power and formed by a fill lens $L_1$ and a parent spherical lens $L_1$;
(b) a biconvex lens $L_3$;
(c) a first meniscus lens $L_4$ having a positive refractive power;
(d) a two-lens composite member $G_2$ having positive refractive power and comprising a biconcave lens $L_5$ and a biconvex lens $L_6$;
(e) a two-lens composite member $G_3$ having positive refractive power and comprising a biconvex lens $L_7$ and a second meniscus lens $L_8$;
(f) a third meniscus lens $L_9$ having negative refractive power; and,
(g) a fourth meniscus lens $L_{10}$ having positive refractive power; and,
wherein a first one of said air spaces ($A_1$) is conjointly defined by said two-lens composite member ($G_1$) and said biconvex lens ($L_3$) and a second one of said air spaces ($A_2$) is conjointly defined by said biconvex lens ($L_3$) and said first meniscus lens ($L_4$).

4. The immersion microscope objective of claim 3, wherein said two of said air spaces are linearly changeable.

5. The immersion microscope objective of claim 3, wherein said fill lens ($L_1$) of said two-lens composite member ($G_1$) has a front face configured to be planar; and, said parent spherical lens ($L_2$) has first and second curved surfaces defining respective curvature centers on a side of said parent spherical lens ($L_2$) facing toward the specimen.

6. The immersion microscope objective of claim 3, wherein said first meniscus lens ($L_4$) has first and second curved surfaces defining respective curvature centers on a side of said first meniscus lens ($L_4$) facing away from the specimen.

7. The immersion microscope objective of claim 3, wherein said second meniscus lens ($L_8$) has first and second curved surfaces defining respective curvature centers on a side of said second meniscus lens ($L_8$) facing toward the specimen.

8. The immersion microscope objective of claim 3, wherein said third meniscus lens ($L_9$) has first and second curved surfaces defining respective curvature centers on a side of said third meniscus lens ($L_9$) facing away from the specimen.

9. The immersion microscope objective of claim 3, wherein said fourth meniscus lens ($L_{10}$) has first and second curved surfaces defining respective curvature centers on a side of said fourth meniscus lens ($L_{10}$) facing toward the specimen.

10. The immersion microscope objective of claim 3, wherein said fill lens ($L_1$) and said parent spherical lens ($L_2$) have the following refractive indices $n_e$ and Abbe numbers $v_e$ for a spectral line (e) of 546.07 nm:
$n_{e'L1} < 1.50$, $v_{e'L1} > 70$
$n_{e'L2} < 1.85$, $v_{e'L2} > 42$.

11. The immersion microscope objective of claim 3, wherein said meniscus lens ($L_9$) and meniscus lens ($L_{10}$) have the following refractive indices $n_e$ and Abbe numbers $v_e$ for a spectral line (e) of 546.07 nm:
$n_{e'L9} > 1.80$, $v_{e'L9} > 45$
$n_{e'L10} < 1.60$, $v_{e'L10} < 40$.

12. The immersion microscope objective of claim 3, wherein the net transmittance at a wavelength of 365 nm is greater than 50% and the net transmittance at a wavelength of 850 nm is greater than 84%.

13. The immersion microscope objective of claim 3, wherein the following data applies to said immersion microscope objective:

| | Radius | Thickness/Space | $n_e$ | $v_e$ |
|---|---|---|---|---|
| Cover glass | Planar | CG | 1.525 | 59.2 |
| | Planar | | | |
| Immersion medium | | $A_0$ | Water/Glycerine/Oil |
| | Planar | | | |
| L1 | | 0.500 | 1.489 | 70.2 |
| | −1.3725 | | | |
| L2 | | 4.990 | 1.888 | 40.5 |
| | −5.2330 | | | |
| | | $A_1$ (variable) | | |
| | 43.4010 | | | |
| L3 | | 2.000 | 1.530 | 76.6 |
| | −10.9840 | | | |
| | | $A_2$ (variable) | | |
| | 10.1450 | | | |
| L4 | | 4.500 | 1.551 | 45.5 |
| | 10.2920 | | | |
| | | $A_3 = 2.300$ | | |
| | −34.4750 | | | |
| L5 | | 1.100 | 1.641 | 42.2 |
| | 8.9125 | | | |
| L6 | | 5.000 | 1.530 | 76.6 |
| | −14.2270 | | | |
| | | $A_4 = 0.100$ | | |
| | 24.0570 | | | |
| L7 | | 5.800 | 1.530 | 76.6 |
| | −7.6076 | | | |

-continued

| | Radius | Thickness/Space | $n_e$ | $v_e$ |
|---|---|---|---|---|
| L8 | | 1.100 | 1.617 | 44.3 |
| | −175.2900 | | | |
| | | $A_5 = 0.356$ | | |
| | 10.1450 | | | |
| L9 | | 7.000 | 1.820 | 46.4 |
| | 6.8786 | | | |
| | | $A_6 = 4.200$ | | |
| | −6.5879 | | | |
| L10 | | 2.830 | 1.597 | 35.0 |
| | −7.3918 | | | |
| | | $A_7 = 0.150$ | | |
| | Planar | | | |
| | | $A_8 = 126.50$ | | |

Tubular lens having a focal length of 164.5 mm.

14. The immersion microscope objective of claim 13, wherein said immersion medium is water and said immersion microscope objective has the following parameters:
numerical aperture=0.8;
imaging scale=−24.7; and,
field of view number=18.

15. The immersion microscope objective of claim 13, wherein said immersion medium is glycerine and said immersion microscope objective has the following parameters:
numerical aperture=0.8;
imaging scale=−25.0; and,
field of view number=18.

16. The immersion microscope objective of claim 13, wherein said immersion medium is oil and said immersion microscope objective has the following parameters:
numerical aperture=0.8;
imaging scale=−25.2; and,
field of view number=18.

17. The immersion microscope objective of claim 3, wherein the following data applies to said immersion microscope objective:

| Immersion | CG | $A_0$ | $A_1$ | $A_2$ |
|---|---|---|---|---|
| Water | 0 | 0.768 | 0.215 | 5.742 |
| Water | 0.170 | 0.600 | 0.301 | 5.563 |
| Glycerine | 0 | 0.769 | 0.495 | 5.160 |
| Glycerine | 0.170 | 0.600 | 0.521 | 5.106 |
| Oil | 0 | 0.769 | 0.616 | 4.910 |
| Oil | 0.170 | 0.600 | 0.616 | 4.910 | wherein: CG=cover glass thickness; $A_0$=work space; $A_1$=said first one of said air spaces; and, $A_2$=said second one of said air spaces.

18. An immersion microscope objective for examining a specimen, the immersion microscope objective comprising:
a plurality of optical lens units conjointly defining an optical axis;
said optical lens units being arranged so as to define respective air spaces between said optical lens units;
an adjusting device for correcting longitudinal chromatic aberrations;
said adjusting device including means for changing two of said air spaces; and,
wherein said longitudinal chromatic aberrations are corrected in a spectral range of 450 nm to 1000 nm and a deviation of the best focus position of a secondary wavelength from a principal wavelength lies within a depth of field.

19. The immersion microscope objective of claim 18, wherein: when using water as the immersion medium, said deviation lies in a range of 450 nm to 950 nm; and, when using oil as the immersion medium, said deviation lies in a range of 480 nm to 1000 nm.

20. The immersion microscope objective of claim 18, wherein said two of said air spaces are linearly changeable.

21. An immersion microscope objective for examining a specimen, the immersion microscope objective comprising:
  a mount;
  a plurality of optical lens units being arranged in said mount so as to conjointly define an optical axis;
  said optical lens units being arranged so as to define respective air spaces between said optical lens units;
  an adjusting device arranged in said mount and including:
  first and second correction rings displaceable in said mount for movement along said optical axis;
  said first and second correction rings holding two mutually adjacent ones of said optical lens units separated by a first one of said air spaces;
  one of said two mutually adjoining optical lens units being disposed at a second one of said air spaces away from one of the remaining ones of said optical units; and,
  a gear assembly operatively connected to said first and second correction rings for moving said first and second correction rings along said axis at different rates of displacement so as to simultaneously vary the magnitude of said first and second air spaces for doing at least one of the following:
  (a) adapting said immersion microscope objective to different immersion mediums;
  (b) correcting aberrations or imaging errors occurring because of a cover glass closing off a specimen vessel for holding a specimen; and,
  (c) correcting longitudinal chromatic aberrations.

* * * * *

UNITED STATES PATENT AND TRADEMARK OFFICE
CERTIFICATE OF CORRECTION

PATENT NO. : 7,782,539 B2
APPLICATION NO. : 11/979580
DATED : August 24, 2010
INVENTOR(S) : Renhu Shi, Ingo Fahlbusch and Werner Kleinschmidt It is certified that error appears in the above-identified patent and that said Letters Patent is hereby corrected as shown below:

In column 2:
Line 41: delete "1 mm,mD" and substitute -- Imm,mD -- therefor.
Lines 42-43: delete "1 mm,oD" and substitute -- Imm,oD -- therefor.

In column 7:
Line 39: delete "between ,said" and substitute -- between said -- therefor.

In column 8:
Lines 14-15: delete "1 mm,oD" and substitute -- Imm,oD -- therefor.

In column 9:
Line 26: delete "$n_{e,L2} < 1.85$, $v_{e,L2} > 42$" and
substitute -- $n_{e,L2} > 1.85$, $v_{e,L2} < 42$ -- therefor.

Signed and Sealed this

Sixteenth Day of November, 2010

David J. Kappos
*Director of the United States Patent and Trademark Office*